(12) United States Patent
Kienke

(10) Patent No.: US 10,017,085 B2
(45) Date of Patent: Jul. 10, 2018

(54) ADJUSTMENT UNIT FOR A VEHICLE ON SEAT AND VEHICLE SEAT

(71) Applicant: JOHNSON CONTROLS GMBH, Burscheid (DE)

(72) Inventor: Ingo Kienke, Wermelskirchen (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 438 days.

(21) Appl. No.: 14/415,869

(22) PCT Filed: Jul. 12, 2013

(86) PCT No.: PCT/EP2013/064849
§ 371 (c)(1),
(2) Date: Jan. 20, 2015

(87) PCT Pub. No.: WO2014/012866
PCT Pub. Date: Jan. 23, 2014

(65) Prior Publication Data
US 2015/0183344 A1 Jul. 2, 2015

(30) Foreign Application Priority Data

Jul. 18, 2012 (DE) ........................ 10 2012 014 139

(51) Int. Cl.
*B60N 2/06* (2006.01)
*B60N 2/22* (2006.01)
(Continued)

(52) U.S. Cl.
CPC ............... *B60N 2/919* (2018.02); *B60N 2/06* (2013.01); *B60N 2/167* (2013.01); *B60N 2/22* (2013.01);
(Continued)

(58) Field of Classification Search
CPC ........ B60N 2/442; B60N 2/919; B60N 2/943; B60N 2/929; B60N 2/06; B60N 2/167; B60N 2/22; B60N 2/224
(Continued)

(56) References Cited

U.S. PATENT DOCUMENTS 4,653,807 A * 3/1987 Hirose ................. B60N 2/2352
248/430
4,995,669 A * 2/1991 Croft .................... B60N 2/2354
297/367 R
(Continued)

FOREIGN PATENT DOCUMENTS

DE 199 42 994 C1 3/2001
DE 10 2009 046384 A1 7/2011
(Continued)

*Primary Examiner* — Milton Nelson, Jr.
(74) *Attorney, Agent, or Firm* — McGlew and Tuttle, P.C.

(57) ABSTRACT

An adjustment unit, for a vehicle seat, is provided for adjusting a position and/or inclination of a component of the vehicle seat. The adjustment unit has a handling element, which is provided in a first direction for applying a first adjustment movement of the component, and in a second direction for applying a second adjustment movement of the component. The adjustment unit is embodied in such a way that the first adjustment movement permits more rapid adjustment of the component than the second adjustment movement.

22 Claims, 2 Drawing Sheets

(51) Int. Cl.
  *B60N 2/16* (2006.01)
  *B60N 2/90* (2018.01)
(52) U.S. Cl.
  CPC ............ *B60N 2/224* (2013.01); *B60N 2/929* (2018.02); *B60N 2/943* (2018.02)
(58) Field of Classification Search
  USPC .................. 297/361.1, 362.11, 361.2, 344.1
  See application file for complete search history.

(56) References Cited

U.S. PATENT DOCUMENTS

| | | | | |
|---|---|---|---|---|
| 7,862,121 B2 * | 1/2011 | Ishijima | ............... | B60N 2/0296 297/367 R |
| 8,708,419 B2 * | 4/2014 | Shimamura | .......... | B60N 2/0705 297/354.12 |
| 9,022,477 B2 * | 5/2015 | Pleskot | .................... | B60N 2/06 297/361.1 |
| 9,296,318 B2 * | 3/2016 | Ootsuka | ............... | B60N 2/0296 |
| 2009/0026791 A1 * | 1/2009 | Ishijima | ............... | B60N 2/0296 296/65.18 |
| 2009/0026825 A1 * | 1/2009 | Ishijima | ............... | B60N 2/0296 297/358 |
| 2009/0058158 A1 * | 3/2009 | Sobieski | ............. | B60N 2/0296 297/338 |
| 2010/0109406 A1 * | 5/2010 | Ueda | .................... | B60N 2/0296 297/358 |

FOREIGN PATENT DOCUMENTS

| | | |
|---|---|---|
| EP | 0 245 861 A2 | 11/1987 |
| FR | 2 750 185 A1 | 12/1997 |

\* cited by examiner

ADJUSTMENT UNIT FOR A VEHICLE ON SEAT AND VEHICLE SEAT

CROSS REFERENCE TO RELATED APPLICATIONS

This application is a U.S. National Phase Application of International Application PCT/EP2013/064849 filed Jul. 12, 2013 and claims the benefit of priority under 35 U.S.C. § 119 of German Patent Application DE 10 2012 014 139.4 filed Jul. 18, 2012, the entire contents of which are incorporated herein by reference.

FIELD OF THE INVENTION

The present invention is based on an adjustment unit for a vehicle seat.

BACKGROUND OF THE INVENTION

Adjustment units for vehicle seats are basically known from the prior art and are used to individually adjust the position or orientation of a seat element of the vehicle seat in order to increase the convenience or safety of a vehicle occupant. For example, seat adjusters can individually adjust the inclination of the backrest. In this connection, the prior art includes both electrically adjustable adjustment units for vehicle seats (also known as power seats) and manually adjustable adjustment units for vehicle seats.

In the adjustment units known from the prior art, it is disadvantageous that the action of setting the correct position of the seat element to be adjusted can be carried out either quickly, in which case it is not possible to achieve a precise setting, or slowly, in which case the adjustment of the seat element takes a comparatively long time. It is also disadvantageous that vehicle seats that must be manually adjusted are significantly less convenient for the user than electrically adjustable vehicle seats, whereas the electrically operated vehicle seats are significantly more expensive than manually adjustable vehicle seats.

SUMMARY OF THE INVENTION

An object of the invention therefore is to disclose an adjustment unit for a vehicle seat that permits a quick and precise adjustment of a seat element to be adjusted. A manually operable adjustment unit should also be achieved, which ensures a user virtually the same operating convenience as an electrically operated adjustment unit and is nevertheless inexpensive.

This object is attained with an adjustment unit for a vehicle seat in which the adjustment unit is provided for adjusting the position and/or inclination of a component of the vehicle seat; the adjustment unit has a control element, which is provided for initiating a first adjusting movement of the component in a first direction and is provided for initiating a second adjusting movement of the component in a second direction; and the adjustment unit is embodied so that the first adjusting movement permits a quicker adjustment of the component than the second adjusting movement.

The adjustment unit according to the invention therefore advantageously permits both a quick adjustment of the component by moving it along the first direction and a precise adjustment of the component by moving it along the second direction. In this way, a user of the vehicle seat can set the optimum position or orientation of the component at any time. The simpler, quicker, and more precise adjustability also increases the safety for the user since the user is thus more likely to set the vehicle seat correctly for his or her size requirements. The adjustment unit according to the invention consequently combines the advantages of an electrical adjustment unit such as increased operating convenience with the advantages of a manual adjustment unit such as low production costs.

According to a preferred embodiment of the present invention, the adjustment unit is embodied so that the first adjusting movement merely releases a orientation locking mechanism of the component, thus allowing the user to freely adjust the position and/or orientation of the component, particularly by means of his or her weight and/or muscle power and so that the second adjusting movement initiates an active change in the position and/or orientation of the component. Thanks to the release of the orientation locking mechanism, the component can be adjusted by the user him- or herself relatively quickly and over a large adjustment range. It is conceivable that the adjustment in this case occurs along a gravitational force acting on the component and/or in a spring-assisted way. The active adjustment of the component through an actuation of the control along the second direction enables a precise adjustment along a predefined, short adjustment path as part of the second adjusting movement. It is conceivable, for example, that the component can be moved in steps in the second adjusting direction in opposition to a spring force by means of a pumping movement of the control element in the second direction. With a movement of the control element in the first direction, first, the orientation locking mechanism or another orientation locking mechanism of the adjustment unit is released and then, an adjusting mechanism of the adjustment unit is driven, which drives a movement of the component by a defined adjustment distance. It is conceivable that the first adjusting movement is carried out in the same direction as the force of gravity so that the force of gravity assists the user in making the adjustment, whereas the second adjusting movement is carried out, for example, in opposition to the force of gravity since in this case, a user-guided adjustment is more difficult and strenuous. Because of the slower adjustment, the second adjusting movement is advantageously also used for finely adjusting the component. This fine adjustment, however, preferably only occurs in opposition to the force of gravity while the freely moving, coarse or quick adjustment in the context of the first adjusting movement is possible, depending on the embodiment, only with assistance by the force of gravity or both in opposition to the force of gravity and with assistance by the force of gravity. The fine adjustment, however, is initiated and caused by the hand of the user on the control element, thus on the whole yielding a manually actuatable adjustment unit whose manufacturing costs are lower than those of the electric motor-driven adjusters. The coarse or quick adjustment is likewise initiated by the hand of the user on the control element, but the coarse or quick adjustment is caused by an introduction of force by the body of the user and/or by the force of gravity. For example, in the case of a component embodied in the form of a backrest, in the context of the first adjusting movement, the backrest is quickly adjusted forward or back in response to the user leaning forward or back whereas in the context of the second adjusting movement, it is possible to carry out a slow forward pumping of the backrest by means of the adjusting mechanism as a fine adjustment.

Another subject of the present invention is a vehicle seat; the vehicle seat has a seat element and a backrest embodied in the form of an adjustable component; the inclination of the backrest relative to the seat element can be pivoted by means of the adjustment unit according to the invention. The adjustment unit has a control element that is provided to initiate a first inclination adjusting movement of the backrest in a first direction and to initiate a second inclination adjusting movement of the backrest in a second direction. The adjustment unit is embodied so that it is possible to carry out a first inclination adjusting movement more quickly than the second inclination adjusting movement. In particular, the first inclination adjusting movement is a free pivoting movement of the backrest, particularly both in the driving direction and against the driving direction, while the second inclination adjusting movement includes a pivoting movement that is restrictively guided by the movement of the control element and has a defined change in the angle of the backrest, particularly in the driving direction. When the control element is moved in the first direction, this releases a orientation locking mechanism, in particular a detent adjuster, of the backrest so that a user's back and his or her muscle power can be used to pivot the backrest rearward against the driving direction and in opposition to a spring force or so that the backrest can be pivoted forward in the driving direction by the spring force (when the user leans forward). When the control element is moved in the second direction, this likewise releases the orientation locking mechanism and pivots the backrest forward by a fixed angle in the driving direction by means of an adjusting mechanism. By pumping the control element several times in the second direction, it is possible to successively pivot the backrest forward to finely adjust it. The control element is preferably a lever, which can be pivoted around a pivot axis that is parallel to the pivot axis of the backrest and whose free end protrudes in the driving direction; lifting the lever involves a rotation along the first direction and depressing the lever involves a rotation along the second direction. Alternatively, it is conceivable for the free end of the lever to protrude against the driving direction and in an upward direction; pulling the lever forward along the driving direction involves a rotation along the second direction and pulling the lever backward against the driving direction involves a rotation along the first direction. In this way, the control element can always be operated by user in an intuitive fashion.

Another subject or embodiment of the present invention is a vehicle seat; the vehicle seat includes a seat part embodied as an adjustable component; the inclination of the seat part can be pivoted by means of the adjustment unit according to the invention. The adjustment unit has a control element that is provided to initiate a first inclination adjusting movement of the seat part in a first direction and to initiate a second inclination adjusting movement of the seat part in a second direction. The adjustment unit is embodied so that it is possible to carry out a first inclination adjusting movement more quickly than the second inclination adjusting movement. The seat part includes either the entire seat surface or only a frontal subregion of the seat surface of the vehicle seat. In particular, the first inclination adjusting movement is a freely moving or spring-force-driven pivoting movement of the seat part while the second inclination adjusting movement involves a pivoting movement that is restrictively guided by the movement of the control element, with a defined change in the angle of the seat part.

Another subject or embodiment of the present invention is a vehicle seat; the vehicle seat includes a seat part as an adjustable component; the height of the seat part can be adjusted by means of the adjustment unit according to the invention. The adjustment unit has a control element, which is provided to initiate a first height adjusting movement of the seat part in a first direction and to initiate a second height adjusting movement of the seat part in a second direction. The adjustment unit is embodied so as to permit a quicker first height adjusting movement than the second adjusting movement. The seat part includes either the entire seat surface or only a frontal subregion of the seat surface of the vehicle seat. In particular, the first height adjusting movement is a freely moving or spring-force-driven pivoting movement of the seat part while the second height adjusting movement includes a pivoting movement that is restrictively guided by the movement of the control element, with a defined change in the angle of the seat part. It is conceivable for the first height adjusting movement to include both a gravity-assisted lowering of the seat part by means of the user's weight in opposition to a spring force, and a spring-force-assisted lifting of the seat part (when the user lifts him- or herself up), while the second height adjusting movement includes a restrictively guided "pumping up" of the set part through exertion of the user's muscle power on the control element.

Another subject or embodiment of the present invention is a vehicle seat; the vehicle seat includes a seat part as an adjustable component, which is mounted to a vehicle floor by means of a longitudinal seat adjusting unit and is supported by means of the longitudinal seat adjusting unit so that it is able to move longitudinally along a driving direction of the vehicle; the longitudinal position of the seat part can be adjusted by means of the adjustment unit according to the invention. The adjustment unit has a control element, which is provided to initiate a first longitudinal adjusting movement of the seat part in a first direction and to initiate a second longitudinal adjusting movement of the seat part in a second direction. The adjustment unit is embodied so as to permit a quicker first longitudinal adjusting movement than the second longitudinal adjusting movement. In particular, the first longitudinal movement is a freely moving or spring-force-driven sliding movement of the seat part along the driving direction, while the second longitudinal adjusting movement includes a sliding movement that is restrictively guided by the movement of the control element, with a defined position change in the position of the seat part in the longitudinal direction.

Other details, features, and advantages of the invention ensue from the drawings and the description of advantageous embodiments taken in conjunction with the drawings. The drawings illustrate embodiments of the invention that are merely examples and do not significantly restrict the concept of the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
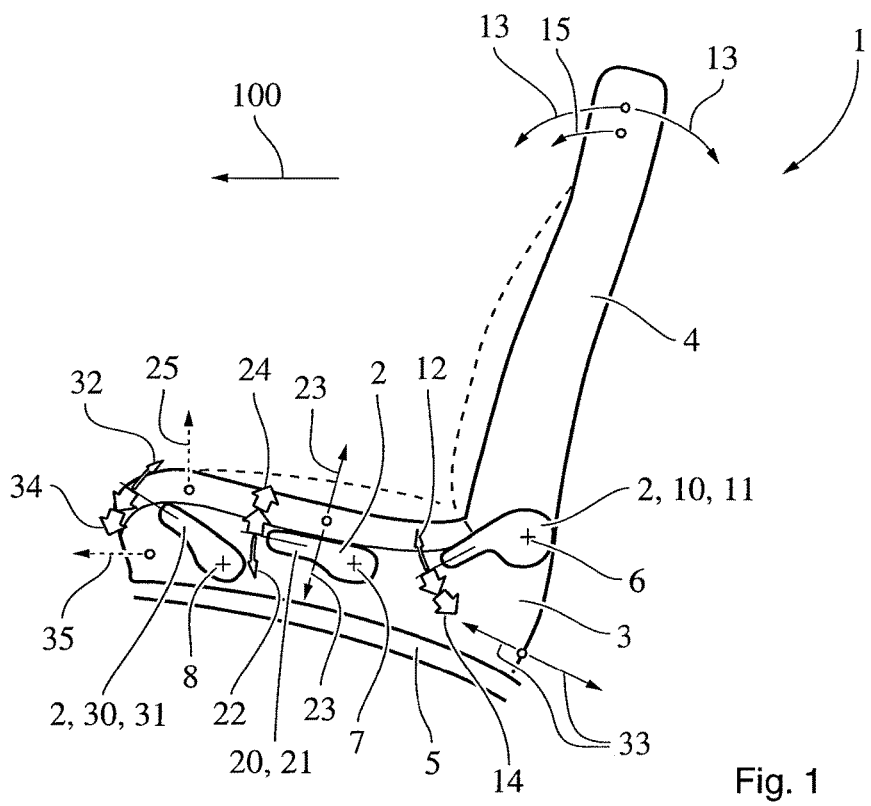
FIG. 1 is a schematic depiction of a vehicle seat with a plurality of adjustment units according to exemplary embodiments of the present invention.

In the different figures, parts that are the same have been consistently provided with the same reference numerals and are therefore as a rule only named or mentioned once.

FIG. 1 is a schematic side view of a vehicle seat 1 with adjustment units 2 according to a first exemplary embodiment of the present invention. The vehicle seat 1 has a seat part 3 and a backrest 4. The seat part 3 is fastened by means of a longitudinal seat adjusting unit 5, in particular a rail system, to a vehicle floor that is affixed to the body of the vehicle (not shown). The longitudinal position of the vehicle seat 1 along the driving direction 100 can be adjusted by means of the longitudinal seat adjusting unit 5. The vehicle seat 1 also has a seat height adjusting mechanism (not shown) by means of which it is possible to adjust the height and/or the inclination of the seat part 3 relative to the vehicle floor. The backrest 4 can be pivoted by means of an inclination adjusting mechanism (not shown) around a pivot axis 6 perpendicular to the longitudinal direction in order to correspondingly adjust the inclination of the backrest 4.

In order to actuate the inclination adjusting mechanism, the vehicle seat 1 has a first adjustment unit 10 with a first control element 11, which is provided to initiate a first inclination adjusting movement 13 of the backrest 4 in a first direction 12 and to initiate a second inclination adjusting movement 15 of the backrest 4 in a second direction 14. The first adjustment unit 10 is embodied so that it is possible to carry out a first inclination adjusting movement 13 more quickly than the second inclination adjusting movement 15 (illustrated by different length arrows). The first inclination adjusting movement 13 includes a free pivoting movement of the backrest 4 by means of an adjusting force exerted by the user or by means of a spring force; the movement of the first control element 11 merely releases a orientation locking mechanism of the backrest 4 for this purpose. The second inclination adjusting movement 15, however, includes a pivoting movement that is oriented forward in the driving direction 100 and restrictively guided by the movement of the first control element 11, with a defined change in the angle of the backrest 4. With a movement of the first control element in the first direction 12, the locking mechanism—in particular a detent adjuster—of the backrest 4 is released so that the backrest 4 can be pivoted by the user's back rearward against the driving direction 100 and in opposition to a spring force or so that the backrest 4 can be pivoted forward in the driving direction 100 by the spring force (when the user leans forward). With a movement of the first control element 11 in the second direction 14, the locking mechanism is likewise released and an adjusting mechanism pivots the backrest 4 by a fixed angle forward against the driving direction 100. By pumping the first control element 11 several times in the second direction 14, it is thus possible to successively pivot the backrest 4 forward. The first control element 11 in this case is a lever that can be pivoted around the pivot axis 6 and whose free end protrudes in the driving direction 100; lifting the lever constitutes a rotation along the first direction 12 and depressing the lever constitutes a rotation along the second direction 14.

To actuate the height adjusting mechanism of the seat part 3, the vehicle seat 1 has a second adjustment unit 20 with a second control element 21, which is provided to initiate a first height adjusting movement 23 of the seat part 3 in a first direction 22 and to initiate a second height adjusting movement 25 of the seat part 3 in a second direction 24. The second adjustment unit 20 is embodied so as to permit a quicker first height adjusting movement 23 than the second adjusting movement 25 (illustrated by different length arrows). The first height adjusting movement 23 includes a freely moving or at most spring-damped downward movement of the seat part 3 by the weight of the user or a spring-loaded upward movement of the seat part 3 when the user reduces the amount of weight acting on the seat part 3; the movement of the second control element 21 releases a height locking mechanism of the seat part 3 for this purpose. By contrast, the second height adjusting movement 25 includes an upward movement of the seat part 3 that is restrictively guided by the movement of the second control element 21 by a smaller, defined height. By pumping the second control element 21 repeatedly in the second direction 24, it is possible to successively move the seat part 3 upward. The second control element 21 is a lever that can be pivoted around another pivot axis 7 parallel to the pivot axis 6 and whose free end protrudes in the driving direction 100; lifting the lever constitutes a rotation along the second direction 24 and depressing the lever constitutes a rotation along the first direction 22.

In order to actuate the longitudinal adjusting mechanism of the vehicle seat 1, the vehicle seat 1 has a third adjustment unit 30 with a third control element 31, which is provided to initiate a first longitudinal adjusting movement 33 of the vehicle seat 1 in a first direction 32 and to initiate a second longitudinal adjusting movement 35 of the vehicle seat 1 in a second direction 34. The third adjustment unit 30 is embodied so as to permit a quicker first longitudinal adjusting movement 33 than the second longitudinal adjusting movement 35 (illustrated by different length arrows). The first longitudinal movement 33 includes a freely moving or at most spring-damped longitudinal movement of the vehicle seat 1 in the driving direction 100 or against the driving direction 100, which is produced by the muscle power of the user; the movement of the third control element 31 merely releases a longitudinal locking mechanism of the longitudinal seat adjusting unit 5 for this purpose. By contrast, the second longitudinal adjusting movement 35 includes a forward movement of the vehicle seat 1 in the driving direction 1 that is restrictively guided by the movement of the third control element 31, with a defined length of the movement. By pumping the third control element 31 repeatedly in the second direction 35, it is possible to successively move the vehicle seat 1 forward. The third control element 31 is a lever that can be pivoted around another pivot axis 7 parallel to the pivot axis 6 and whose free end protrudes in the driving direction 100; lifting the lever constitutes a rotation along the first direction 32 and depressing the lever constitutes a rotation along the second direction 34.

Figure 2:
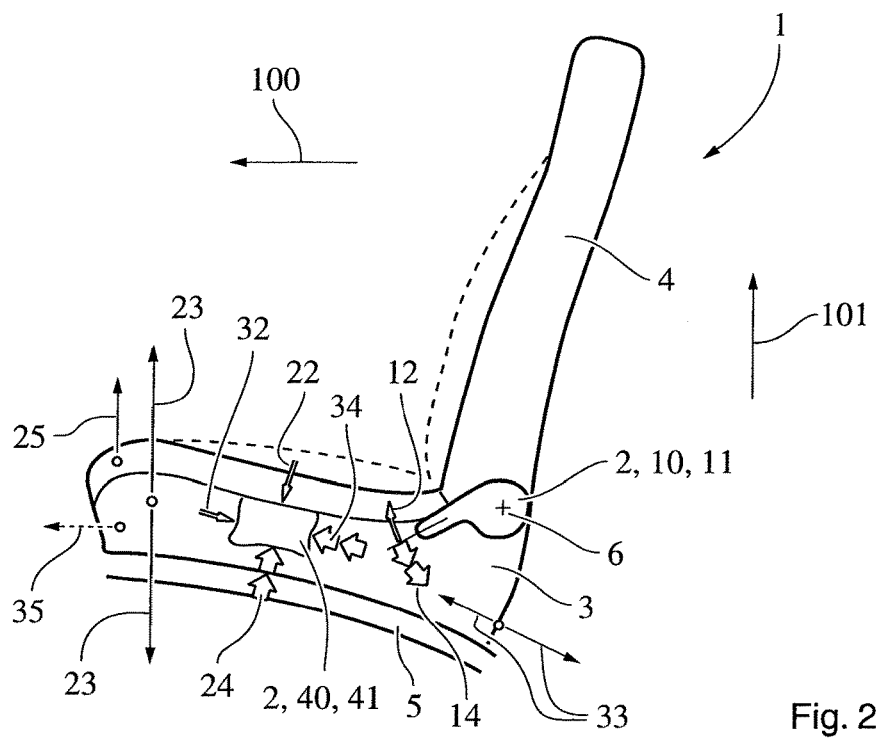
FIG. 2 is a schematic depiction of a vehicle seat with a plurality of adjustment units according to other exemplary embodiments of the present invention.

FIG. 2 shows a schematic side view of a vehicle seat with adjustment units according to a second exemplary embodiment of the present invention; the second exemplary embodiment is essentially identical to the first exemplary embodiment illustrated in FIG. 1; by contrast with it, the second and third adjustment units 20, 30 are integrated into a shared fourth adjustment unit 40. The fourth adjustment unit 40 includes a fourth control element 41, which simultaneously fulfills the functionality of the second and third control elements 21, 31. The fourth control element 41 can be moved against the driving direction 100 in order to produce the movement of the third control element 31 in the first direction 32 and to initiate the first longitudinal adjusting movement 33. The fourth control element 41 can also be moved in the driving direction 100 in order to produce the movement of the third control element 31 in the second direction 34 and to initiate the second longitudinal adjusting movement 35. The fourth control element 41 can also be moved opposite the upward direction 101 in order to produce the movement of the second control element 21 in the first direction 22 and to initiate the first height adjusting movement 23. The fourth control element 41 can also be moved in the upward direction 101 in order to produce the movement of the second control element 21 in the second direction 24 and to initiate the second height adjusting movement 25.

Figure 3:
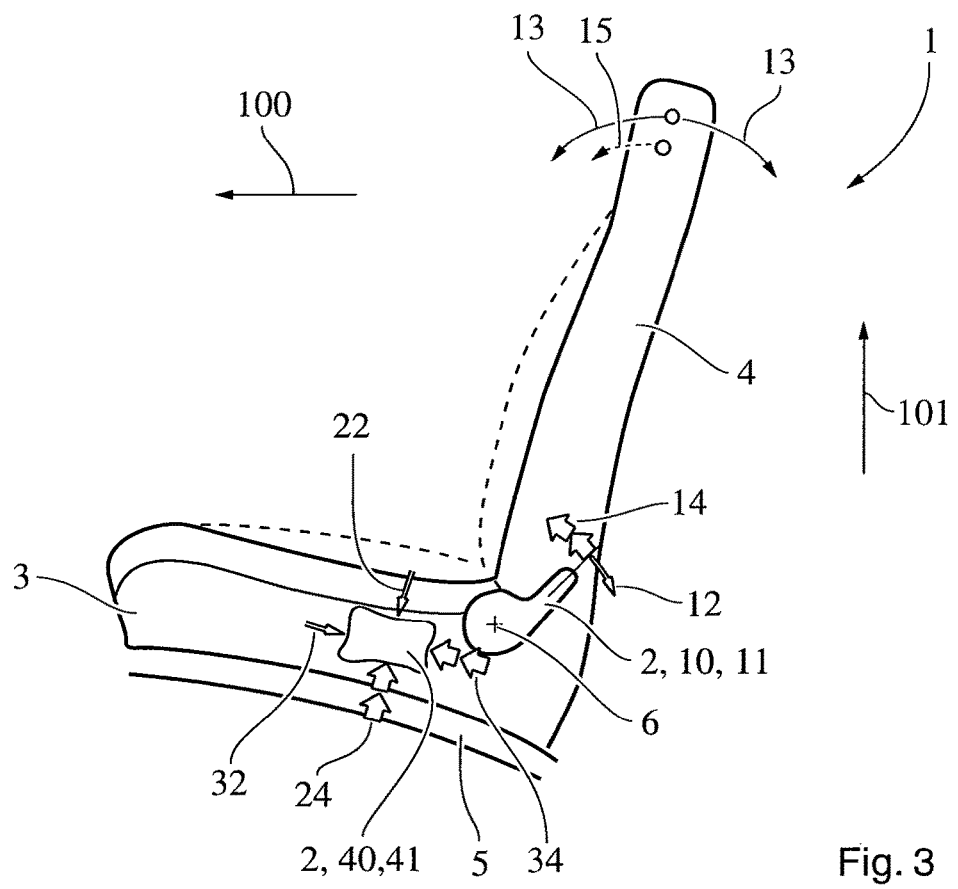
FIG. 3 is a schematic depiction of a vehicle seat with a plurality of adjustment units according to other exemplary embodiments of the present invention.

FIG. 3 shows a schematic side view of a vehicle seat with adjustment units according to a third exemplary embodiment of the present invention; the third exemplary embodiment is essentially identical to the second exemplary embodiment illustrated in FIG. 2; by contrast with it, the free end of the lever of the first control element 11 protrudes against the driving direction 100 and in a diagonally upward direction 101; pulling the lever forward along the driving direction 100 constitutes a rotation along the second direction 14 and pulling the lever back against the driving direction 100 constitutes a rotation along the first direction 12.

While specific embodiments of the invention have been shown and described in detail to illustrate the application of the principles of the invention, it will be understood that the invention may be embodied otherwise without departing from such principles.

The invention claimed is:

1. An adjustment unit for a vehicle seat, for adjusting a position and/or an inclination of an adjustable component of the vehicle seat, the adjustment unit comprising:
a control element for initiating a first adjusting movement of the component in a first direction, the first adjusting movement being carried out in a same direction as a force of gravity, and for initiating a second adjusting movement of the component in a second direction, the second adjusting movement being carried out in opposition to the force of gravity, wherein the adjustment unit is embodied to permit by means of the first adjusting movement a quicker adjustment of the component than by means of the second adjusting movement, wherein the adjustment unit is configured to allow a user to freely adjust the position by means of the first adjusting movement and/or orientation of the component, wherein the adjustment unit is configured to initiate by means of the second adjusting movement an active change in the position and/or orientation of the component, wherein the adjustment unit is further configured to cause in the first adjustment movement a coarse adjustment of the component by means of an introduction of force by the body of the user and/or by the force of gravity, wherein the coarse adjustment in the first adjusting movement is provided with assistance by the force of gravity, the adjustment unit being further configured to let occur in the second adjustment movement of the component a fine adjustment in opposition to the force of gravity.

2. An adjustment unit according to claim 1, wherein the first adjusting movement has a directional component parallel to the spring force and/or the force of gravity.

3. An adjustment unit according to claim 1, wherein the adjustment unit is embodied so that with a movement of the control element in the first direction first, allowing the user to freely adjust the position by means of the first adjusting movement or another adjusting movement and subsequently, an adjusting mechanism of the adjustment unit is driven, which drives a movement of the component by a defined adjustment distance as part of the second adjusting movement.

4. An adjustment unit according to claim 3, wherein with the second adjusting movement, the component is moved in steps in a second direction in opposition to a spring force and/or the force of gravity by means of a pumping movement of the control element in the second direction.

5. A vehicle seat comprising:
a seat element;
a backrest embodied in the form of an adjustable component; and
an adjustment unit comprising a control element for initiating a first adjusting movement of the component in a first direction, the first adjusting movement being carried out in a same direction as a force of gravity, and for initiating a second adjusting movement of the component in a second direction, the second adjusting movement being carried out in opposition to the force of gravity, wherein the adjustment unit is configured to permit by means of the first adjusting movement a quicker adjustment of the component than by means of the second adjusting movement, wherein the adjustment unit is configured to allow a user to freely adjust the position via the first adjusting movement and/or orientation of the component, wherein the adjustment unit is configured to initiate by means of the second adjusting movement an active change in the position and/or orientation of the component, wherein the adjustment unit is further configured to cause in the first adjustment movement a coarse adjustment of the component by means of an introduction of force by the body of the user and/or by the force of gravity, wherein the coarse adjustment in the first adjusting movement is provided with assistance by the force of gravity, the adjustment unit being further configured to let occur in the second adjustment movement of the component a fine adjustment in opposition to the force of gravity, wherein an inclination of the backrest relative to the seat element can be pivoted by means of the adjustment unit.

6. The vehicle seat according to claim 5, wherein the adjustment unit is embodied so that with a movement of the control element in the first direction, a freely moving or spring-force driven first inclination adjusting movement of the backrest in a driving direction and/or against the driving direction is enabled.

7. A vehicle seat according to claim 5, wherein the adjustment unit is embodied so that with a movement of the control element in the second direction, the user is allowed to freely adjust the position and/or the orientation of the component and in addition, the backrest is pivoted forward by a fixed angle against a driving direction and/or in opposition to the spring force and/or in a spring-assisted fashion.

8. A vehicle seat according to claim 7, wherein the control element comprises a lever, which can be pivoted around a pivot axis that is parallel to a pivot axis of the backrest, the lever having a free end that protrudes in a driving direction, wherein lifting the lever provides a rotation along the second direction and depressing the lever provides a rotation along the first direction.

9. A vehicle seat according to claim 8, wherein the free end of the lever protrudes against a driving direction and points upward and wherein pulling the lever forward in the driving direction provides a rotation along the first direction and pulling the lever backward against the driving direction provides a rotation along the second direction.

10. A vehicle seat according to claim 5, wherein the movement of the control element in the second direction initiates a first inclination adjusting movement of the backrest and movement of the control element in the first direction initiates a second inclination adjusting movement of the backrest.

11. A vehicle seat according to claim 10, wherein the adjustment unit is embodied so that the first inclination adjusting movement is a free pivoting movement of the backrest and the second inclination adjusting movement includes a pivoting movement of the backrest that is restrictively guided by the movement of the control element and has a defined change in the angle of the backrest.

12. A vehicle seat according to claim 10, wherein the seat element moves a first distance in the first direction, the seat element moving a second distance in the second direction, wherein the second distance is less than the first distance.

13. A vehicle seat comprising:
a seat part embodied as an adjustable component; and
an adjustment unit comprising a control element for initiating a first adjusting movement of the component in a first direction, the first adjusting movement being carried out in a same direction as a force of gravity, and for initiating a second adjusting movement of the component in a second direction, the second adjusting movement being carried out in opposition to the force of gravity, wherein the adjustment unit is configured to permit by means of the first adjusting movement a quicker adjustment of the component than by means of the second adjusting movement, wherein the adjustment unit is configured to allow a user to freely adjust the position via the first adjusting movement and/or orientation of the component, wherein the adjustment unit is configured to initiate by means of the second adjusting movement an active change in the position and/or orientation of the component, wherein the adjustment unit is further configured to cause in the first adjustment movement a coarse adjustment of the component by means of an introduction of force by the body of the user and/or by the force of gravity, wherein the coarse adjustment in the first adjusting movement is provided with assistance by the force of gravity, the adjustment unit being further configured to let occur in the second adjustment movement of the component a fine adjustment in opposition to the force of gravity, wherein an inclination or height of the seat part is adjusted by means of the adjustment unit.

14. A vehicle seat according to claim 13, wherein the control element can be moved in a first direction to initiate a first inclination- and/or height adjusting movement of the seat part and can be moved in a second direction to initiate a second inclination- and/or height adjusting movement of the seat part.

15. A vehicle seat according to claim 14, wherein the adjustment unit is embodied to provide a quicker first inclination and/or height adjusting movement than a second inclination and/or height adjusting movement.

16. A vehicle seat according to claim 14, wherein the seat part includes an entire seat surface of the vehicle seat or only a frontal subregion of the seat surface of the vehicle seat.

17. A vehicle seat according to claim 14, wherein the first inclination- and/or height adjustment is provided parallel to the force of gravity and/or in opposition to a spring force and the second inclination- and/or height adjustment is provided antiparallel to the force of gravity and/or along a spring force.

18. A vehicle seat according to claim 14, wherein the adjustment unit is embodied such that the first inclination- and/or height adjusting movement includes a freely moving or spring-force-driven pivoting- and/or height adjusting movement of the seat part and the second pivoting- and/or height adjusting movement includes a pivoting- and/or height adjusting movement of the seat part that is restrictively guided by the movement of the control element, with a defined change in the angle and/or height.

19. A vehicle seat comprising
a seat part embodied as an adjustable component; and
a longitudinal seat adjusting unit wherein:
the adjustment unit comprises a control element for initiating a first adjusting movement of the component in a first direction, the first adjusting movement being carried out in a same direction as a force of gravity, and for initiating a second adjusting movement of the component in a second direction, the second adjusting movement being carried out in opposition to the force of gravity, wherein the adjustment unit is configured to permit by means of the first adjusting movement a quicker adjustment of the component than by means of the second adjusting movement, wherein the adjustment unit is configured to allow a user to freely adjust the position by the first adjusting movement and/or orientation of the component, wherein the adjustment unit is configured to initiate by means of the second adjusting movement an active change in the position and/or orientation of the component, wherein the adjustment unit is further configured to cause in the first adjustment movement a coarse adjustment of the component by means of an introduction of force by the body of the user and/or by the force of gravity, wherein the coarse adjustment in the first adjusting movement is provided with assistance by the force of gravity, the adjustment unit being further configured to let occur in the second adjustment movement of the component a fine adjustment in opposition to the force of gravity;
the seat part is mounted to a vehicle floor by means of the longitudinal seat adjusting unit and is supported by means of the longitudinal seat adjusting unit to move longitudinally, parallel or antiparallel to a driving direction of the vehicle and the longitudinal position of the seat part can be adjusted by means of the adjustment unit.

20. A vehicle seat according to claim 19, wherein the adjustment unit comprises a control element to initiate a first longitudinal adjusting movement of the seat part in a second direction and to initiate a second longitudinal adjusting movement of the seat part in a first direction.

21. A vehicle seat according to claim 19, wherein the adjustment unit is embodied so that it provides a quicker first longitudinal adjusting movement than a second longitudinal adjusting movement.

22. A vehicle seat according to claim 19, wherein the adjustment unit is embodied so that the first longitudinal movement includes a freely moving or spring-force-driven sliding movement of the seat part parallel or antiparallel to the driving direction, while the second longitudinal adjusting movement includes a sliding movement of a position of the seat part that is restrictively guided by the movement of the control element, antiparallel to the driving direction, with a defined position change.

\* \* \* \* \*